United States Patent [19]

Soni

[11] Patent Number: 5,037,617
[45] Date of Patent: Aug. 6, 1991

[54] APPARATUS FOR THE RETURN OF PARTICULATE SOLIDS THROUGH A CYCLONE SEPARATOR TO A VESSEL

[75] Inventor: Dalip S. Soni, Houston, Tex.

[73] Assignee: Stone & Webster Engineering Corporatoin, Boston, Mass.

[21] Appl. No.: 461,065

[22] Filed: Jan. 4, 1990

[51] Int. Cl.$^5$ .......................... F27B 15/09; B01J 8/26
[52] U.S. Cl. .................................. 422/142; 34/57 A; 55/180; 422/143; 422/144
[58] Field of Search ........ 422/143, 144, 147, 141-142; 55/337, 181, 180, 459.1; 34/57 A; 110/245; 122/4 D; 431/7, 170

[56] References Cited

U.S. PATENT DOCUMENTS

| | | | |
|---|---|---|---|
| 2,535,140 | 9/1946 | Kassel | 183/83 |
| 2,604,384 | 7/1952 | Border et al. | 422/147 X |
| 2,766,185 | 10/1956 | Pansing | 422/144 X |
| 2,784,803 | 4/1954 | Saxton | 183/85 |
| 2,854,402 | 9/1958 | Rex | 422/144 X |
| 3,114,699 | 12/1963 | Hardison | 208/159 |
| 3,208,831 | 9/1965 | Belden | 422/144 |
| 3,261,776 | 7/1966 | Baumann et al. | 422/144 X |
| 3,579,616 | 5/1971 | Reh et al. | 422/144 X |
| 3,607,129 | 9/1971 | Carson | 23/288 S |
| 3,732,081 | 5/1973 | Carson | 23/288 S |
| 3,767,566 | 10/1973 | Cartmell | 208/120 |
| 3,926,843 | 12/1975 | Owen | 422/144 X |
| 4,246,231 | 1/1981 | Figler et al. | 422/147 |
| 4,332,674 | 6/1982 | Dean et al. | 208/120 |
| 4,336,160 | 6/1982 | Dean et al. | 252/417 |
| 4,419,965 | 12/1983 | Garcia Mallol et al. | 110/245 X |
| 4,606,814 | 8/1986 | Haddad et al. | 208/161 |
| 4,623,446 | 11/1986 | Haddad et al. | 208/113 |
| 4,764,268 | 8/1988 | Lane | 208/113 |
| 4,786,622 | 11/1988 | Walters et al. | 502/44 |
| 4,813,479 | 3/1989 | Wahlgren | 110/245 X |
| 4,955,295 | 9/1990 | Abdulally | 110/245 X |

Primary Examiner—Robert J. Warden
Assistant Examiner—Amalia L. Santiago
Attorney, Agent, or Firm—Hedman, Gibson, Costigan & Hoare

[57] ABSTRACT

An apparatus and process for transferring and regulating the recycle of particulate solids separated from a gas-particulate solids suspension in which an auxiliary vessel and slanted pipe are provided to transfer and regulate particulate solids flow.

7 Claims, 1 Drawing Sheet

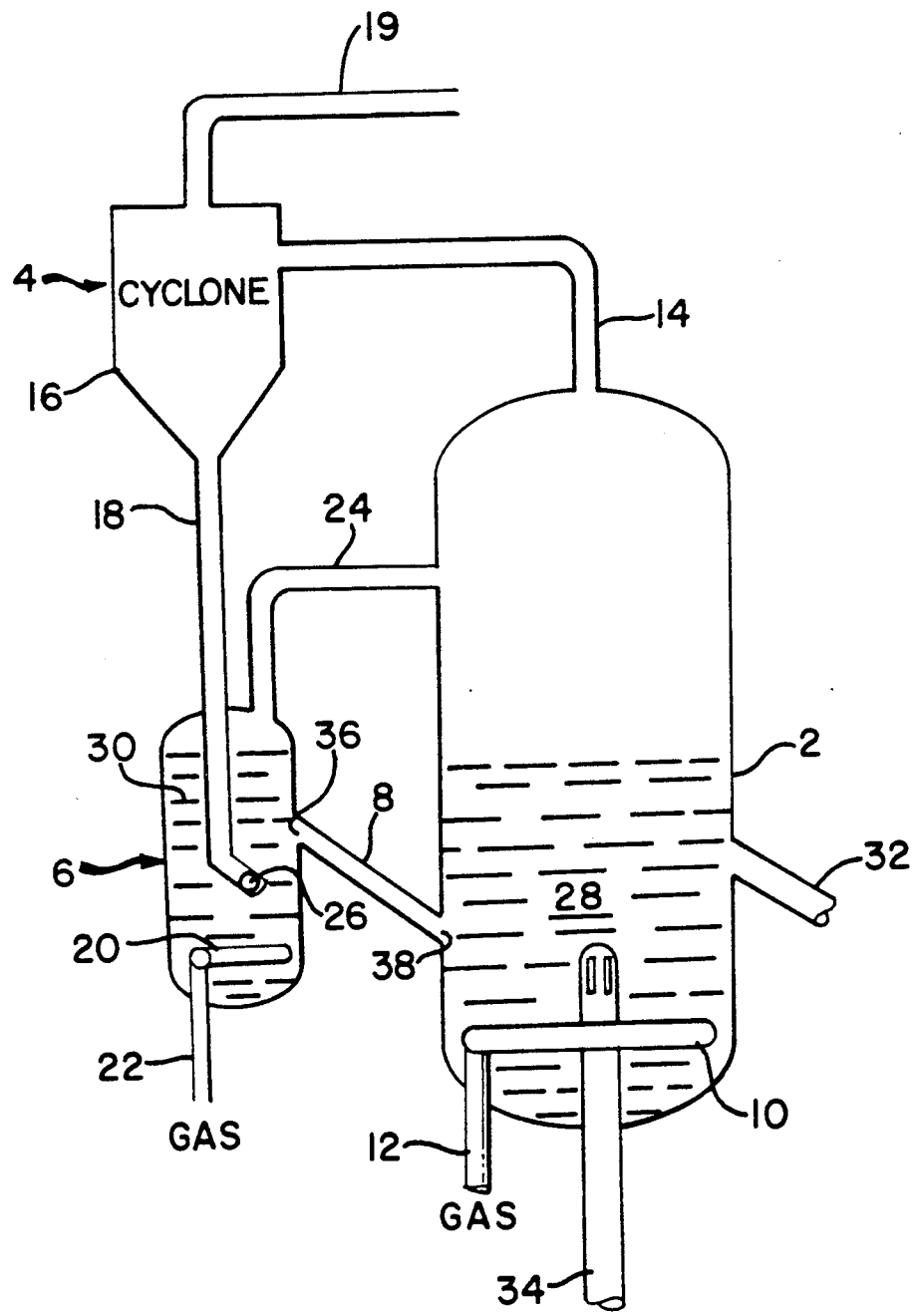

APPARATUS FOR THE RETURN OF PARTICULATE SOLIDS THROUGH A CYCLONE SEPARATOR TO A VESSEL

FIELD OF THE INVENTION

The subject invention relates generally to separation of particulate solids and gases from a mixed solids-gas suspension phase. More particularly, the invention relates to an apparatus and process that facilitates the transfer and recycle of particulate solids separated from a solids-gas suspension phase back to the vessel from which these solids were entrained originally, or to any other vessel.

BACKGROUND OF THE INVENTION

The separation of particulate solids from a solids-gas suspension phase has been practiced for many years. Removal of solids from a flue gas is one area in which particulate solids have been separated from a solids-gas suspension phase.

More recently, a large body of separation technology has been developed in the field of fluidized bed hydrocarbon cracking. Typically, heated particulate solids, either inert or catalytic, are contacted with a hydrocarbon feedstock in a reactor to vaporize the feedstock. Thereafter, the vaporized feedstock and particulate solids must be separated from the mixed particulate solids-vaporized gas suspension phase with the vaporized feedstock being sent on for further processing and the particulate solids being heated and recycled for delivery to the reactor. In addition, the vessels used to heat the particulate solids must have provisions to vent or discharge the combustion gases that result from heating the particulate solids, usually by combusting the carbon or coke formed on the particulate solids during the processing of hydrocarbons, usually by a cracking reaction. The vent is usually a flue through which the combustion gases flow with entrained particles. Because of the value of the particulate solids, particularly catalyst particles, and the environmental regulations limiting the amount of catalyst particles that can be discharged into the atmosphere, means must be provided to separate the particulate solids from the vent gas.

Various devices have been used to separate particulate solids entrained with the gas streams, such as hydrocarbon vapors, flue gases, air, or any other gas or mixture of gases. One commonly used separation device is the now conventional cyclone separator. Several cyclone separators may be used depending upon the amount of gas to be processed and often cyclone separators are used in series to obtain a maximum recovery of the particulate solids from the vaporized gas stream. The cyclone separators typically are vertically oriented and comprise a cylindrical separation section, a conical section extending from the bottom of the cylindrical separator section and a dipleg through which the separated solids are discharged for recycle or transfer to another processing unit or a vessel for further disposal or treatment.

Further, the process of recycling or returning particulate solids recovered by a cyclone or several cyclones to the original vessel encounters problems due to pressure differentials in the system. The pressure in the cyclone is lower than the pressure in the original vessel due to a pressure drop of the gas-solid suspension as it passes through the cyclone system. To enable the solids to flow from the cyclone, at a lower pressure point, to the original vessel, or any other vessel which is at a pressure higher than the pressure in the cyclone, the dipleg or pipe is connected at the bottom of the cyclone and the solids in it are kept in a fluidized state by the gas entrained with solids. If required, additional aeration with any suitable gaseous medium may be provided to keep the solids in the dipleg in a properly fluidized state. The static head built up by the column of fluidized solids in the dipleg overcomes the pressure differential between the cyclone and the vessel to which the fluidized solids are being transferred or returned, causing the solids to flow from the cyclone through the dipleg to the vessel.

To facilitate the transfer and flow of solids from the dipleg to the vessel, mechanical valves such as J-valves, flapper valves or trickle valves located at the terminal end of the dipleg are used. These valves provide a seal at the end of the dipleg to prevent gas from flowing from the vessel to the cyclone when circulation of solids through the cyclone has not been established.

The cyclone separators are known to be placed internal to the vessel which has a fluidized bed in which combustion or any other chemical reaction is taking place. For example, cyclone separators found in conventional fluid catalytic conversion (FCC) systems for cracking of hydrocarbons are generally located within the vessel assemblies, such as the regenerator or reactor/disengager. When the cyclones are placed internal to the vessel, return or recycle of the solids recovered by the cyclone, it is known in the art to position the dipleg vertically down from the cyclone to the fluidized bed. The dipleg end may be submerged in the fluidized bed in the vessel, or it may discharge the solids at the top of the bed.

However, in certain situations, it is advantageous to locate the cyclone external to the vessel from which entrainment is taking place. This may be the case when the temperature in the vessel is too high. Locating the cyclone external to the vessel removes the metallurgical constraints posed by the high temperature. For example, with the advent of high temperature FCC systems, locating the cyclones external to the regenerator gives the advantage of using carbon steel instead of stainless steel.

Unlike the situation where cyclones are placed internal to the vessel in which the entrainment occurs, the provision of exteriorly located cyclone separators requires the return of recovered catalyst to the system vessels through piping offset from the system vessel. It would therefore be a notable advance in the state of the art if an apparatus and process could be provided with a means for returning particulate solids from an external cyclone to a desired piece of system equipment which would result in a smooth transfer of fluidized solids without the possibility of reverse flow or clog.

SUMMARY OF THE INVENTION

It is an object of the present invention to provide a process and apparatus for the smooth transfer and regulation of the flow of particulate solids that have been separated from a solids-gas suspension phase.

It is another object of the present invention to provide a process and apparatus for the transfer and regulation of the flow of particulate catalytic solids during recycle of the catalyst particles of a FCC system.

The apparatus of the present invention is comprised of a cyclone separator located exterior of a system vessel, piping to deliver a solids-gas suspension phase mixture from the vessel to the cyclone separator, an auxiliary bed separate from both the cyclone separator and the system vessel piping to transfer recovered particulate solids from the cyclone to the auxiliary bed, piping to return the recycle particulate solids from the auxiliary bed to the main bed, and means to fluidize the auxiliary bed.

The process of the invention proceeds by delivering a solids-gas suspension phase from a vessel, in which a main fluidized bed of particulate solids is located, to the cyclone separator, separating gas from the particulate solids, sending the separated gas downstream for further processing or venting to atmosphere and discharging the separated particulate solids through the cyclone dipleg into the auxiliary bed. The auxiliary bed is fluidized at a superficial velocity that facilitates regulated flow of the solids from the auxiliary bed to the main bed. The provision of the auxiliary bed gives the flexibility to fluidize the auxiliary bed independent of any other process considerations such as where the main bed must be fluidized at a certain velocity to satisfy the main process requirements.

The superficial velocity at which the auxiliary bed is fluidized is determined only from consideration of achieving proper dipleg operation when the dipleg is submerged in the bed. The operation of the auxiliary bed is independent from the main bed operation, and to some degree, provides independent control of the dipleg back up, i.e. catalyst level in the bed, and hence cyclone operation. This independent control is exercised by varying the degree of fluidization, and hence the density, in the auxiliary bed. Moreover, the effects of malfunctioning or instability in the main bed on the dipleg are dampened by the surge capacity between the main bed and auxiliary bed. Further, the auxiliary bed allows the geometry of the dipleg to be vertically straight which also aids in smoother flow of fluidized particulate solids, as it is known to those skilled in the art that the flow of fluidized particulate solids around bends and corners is difficult, or not as smooth as desired.

DESCRIPTION OF THE DRAWING

The drawing illustrates the present invention in the environment of an FCC regenerator.

DESCRIPTION OF THE PREFERRED EMBODIMENT

The present invention has general application in the separation of particulate solids and gases from a solids-gas suspension phase and, in particular, the transfer and control and regulation of the flow of separated particulate solids in a recycle system when the cyclone is placed external to the main bed. However, the invention will be described in the specific environment of a FCC (Fluid Catalytic Cracking) regenerator system.

As seen in the drawing, the catalyst regenerator 2 of an FCC system is shown. The FCC system reactor and anciliary equipment are omitted from the drawing but familiarity with the overall FCC process is assumed and is set forth in many published documents such as U.S. Pat. Nos. 4,331,533 (May 25, 1982; Dean et al.) and 4,336,160 (June 22, 1982; Dean et al). These patents are hereby incorporated by reference.

The system includes principally the catalyst regenerator 2, a conventional cyclone separator 4, an auxiliary vessel 6, and a slanted pipe 8.

Illustratively, the catalyst regenerator 2 includes a conventional fluidization ring 10, a line 12 to deliver gas (air) to the ring 10 and an overhead line 14 to deliver the solids-gas suspension of combustion gas to the cyclone 4. A main bed 28 of regenerated catalyst is contained in the catalyst regenerator 2. Also illustrated are the entry line 34 for the catalyst particles to be regenerated and the delivery line 32 for transfer of regenerated catalyst particles to the system reactor (not shown).

The cyclone separator 4 is conventional and is comprised of a separator section 16, a dipleg 18 and an overhead line 19 to discharge the vent gas separated from the particulate solids-gas suspension phase.

The auxiliary vessel 6 is provided with a fluidization gas ring 20, a pipe 22 to deliver fluidization gas to the fluidization gas ring 20, and a vent line 24 arranged to return vent gas and entrained particles to the main bed 28 in the second stage catalyst regeneration vessel 2. An auxiliary bed 30 of particulate solids is contained in the auxiliary vessel 6.

The slanted pipe 8 is arranged at an angle to the horizontal and connects to the auxiliary vessel 6 and to catalyst regenerator 2 at opening 38. The fluidizing rings in the regenerator and the auxiliary bed may be in the form of grids or any other distribution device. The regenerator may be the first or second regenerator of a two stage regenerator system or the regenerator of a single stage regenerator system. The catalyst particles with coke or carbon deposits may enter the regenerator from the bottom as shown (line 34), or top, or side of the regenerator. Similarly, the regenerated catalyst may be withdrawn from the top, or side as shown (line 32), or bottom of the regenerator.

In operation, catalyst particles with coke or carbon deposits are transported through transport line 34 to the regeneration vessel 2. Therein, the carbon or coke is burned with air and/or oxygen delivered to the vessel 2 through ring 10 at high temperatures typically in the range of 1200° F.–1600° F. The combustion gases are withdrawn as flue gas through gas line 14 and pass through the cyclone separator 4 to the flue gas line 19.

Entrained solids are separated conventionally from the flue gas in the cyclone separator 4 and discharged through the dipleg 18 to the auxiliary vessel 6 into the auxiliary bed 30 of particulate solids. The auxiliary bed 30 is maintained in the fluidized state by fluidizing gas delivered through line 22 to the fluidizing distributor ring 20.

Many variatiods of the present invention will suggest themselves to those skilled in the art in light of the above-detailed description. For example, the process and apparatus of the present invention may be employed in any process where it is desirable to separate entrained particulate solids from a gaseous stream, e.g., a catalyst regenerator in a single regenerator system, regenerators of a multi-stage regeneration system, a fluidized bed coal conversion process or the like. It is also contemplated that separation devices other than a cyclone separator or series of cyclone separators may be employed. Further, more than one dipleg extending from the separation device to the auxiliary vessel may be employed, and the dipleg may have any one of a number of mechanical valves attached to the end protruding into the auxiliary bed, including but not limited to trickle valves, J-valves and flapper valves. Additionally, it is contemplated that the diplegs may discharge at the top of the auxiliary bed, or in the auxiliary bed. All such obvious modifications are within the full intended scope of the appended claims.

I claim:

1. An apparatus for separating particulate solids from a mixed phase gas-particulate solids suspension comprising:

a main vessel having means for generating a mixed phase gas-particulate solids suspension;

an external gas-particulate solids separator;

at least one dipleg extending from the separator;

means for delivering the mixed phase gas-particulate solids suspension from the main vessel to the separator;

means for venting gas from the separator;

an auxiliary vessel into which the separator dipleg extends adapted for containing a bed of particulate solids;

a flow line conduit extending from an opening in the auxiliary vessel located at an elevation above the end of the separator dipleg in the auxiliary vessel to an opening in the lower portion of the main vessel;

means to fluidize the bed of particulate solids in the auxiliary vessel; and means for returning gas from the auxiliary vessel to the main vessel comprising a flow line conduit extending from the top portion of the auxiliary vessel to an opening in the top portion of the main vessel.

2. An apparatus as in claim 1 wherein said main vessel is adapted for containing a bed of particulate solids and wherein said means to fluidize the bed of particulate solids in the auxiliary vessel further comprises a means to regulate the density of the bed of particulate solids in the auxiliary vessel.

3. An apparatus as in claim 2 wherein the means for fluidizing the auxiliary vessel is independent from the means for fluidizing of the main vessel.

4. An apparatus as in claim 3 wherein the flow line conduit extending from the auxiliary vessel to the main vessel is a slanted pipe extending downwardly from the auxiliary vessel to the main vessel.

5. An apparatus as in claim 1 wherein the separator is a cyclone separator.

6. An apparatus as in claim 5 further comprising a mechanical valve at the end of the dipleg.

7. An apparatus as in claim 6 wherein said mechanical valve is selected from the group consisting of a trickle valve, a J-valve, a counterweighted valve and a flapper valve.

* * * * *